United States Patent [19]
Duchateau et al.

[11] 3,844,835
[45] Oct. 29, 1974

[54] USE OF LIME IN SUCRATE - FACTORY

[75] Inventors: Georges F. M. F. Duchateau, Tienen; Romain G. E. Vandewijer, Kumtich-Vissenaken, both of Belgium

[73] Assignee: Raffinerie tirlemontoise, Brussels, Belgium

[22] Filed: Nov. 15, 1972

[21] Appl. No.: 306,785

[30] Foreign Application Priority Data
Nov. 19, 1971 Belgium .............................. 775564
Nov. 7, 1972 Belgium .............................. 791033

[52] U.S. Cl. .......................... 127/47, 127/9, 127/56
[51] Int. Cl. ........................................... C13j 1/04
[58] Field of Search .......................... 127/47, 50, 56

[56] References Cited
UNITED STATES PATENTS
2,016,609  10/1935  Meredith .............................. 127/47
3,687,727  8/1972  Vandewyer .......................... 127/47

*Primary Examiner*—Morris O. Wolk
*Assistant Examiner*—Sidney Marantz
*Attorney, Agent, or Firm*—Sughrue, Rothwell, Mion, Zinn and Macpeak

[57] ABSTRACT

An improvement in the cold precipitation process of sugar-factory molasses by decanting the precipitated molasses prior to filtration and then recirculating at least a portion of the thickened slurries from decantation to additional diluted molasses for the precipitation step prior to the addition of quick-lime thereto.

11 Claims, 2 Drawing Figures

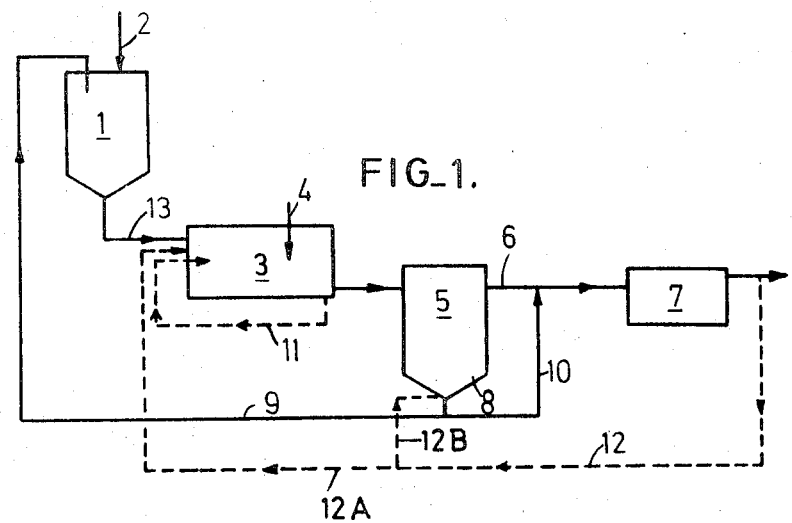

USE OF LIME IN SUCRATE - FACTORY

This invention relates to a process for cold treatment of sugar-factory molasses, comprising addition of quicklime to diluted molasses, giving rise to a precipitation of the saccharose-lime combination formed by said addition of quicklime, and filtration of the so treated molasses.

This process is well known as the cold precipitation step of the Steffen's process, which Steffen's process can be completed by a further step of hot precipitation of the saccharose still present in the filtrate issuing from the cold precipitation step.

The cold Steffen's process was improved by carrying out a recirculation of a portion of the treated molasses, before filtration, into the diluted molasses, before addition of quicklime. This improvement is described in several patents of the company Raffinerie tirlemontoise, the original ones amongst said patents being Belgian Pat. Nos. 735,802 and 752,442. Said improvement has for its object to improve filterability of the treated molasses and stability of the saccharose-lime combination. Furthermore it allows one to increase concentration of the diluted molasses up to 15 percent of saccharose, which is very much desirable when the filtrate is used after suitable evaporation as cattle food.

In order to precipitate one mol of saccharose as lime trisaccharate, theoretically 3 mols of quicklime (CaO) are needed, i.e., about 50g of CaO per 100 g of saccharose.

Besides in industrial practice, a substantially greater amount of quicklime is always used. The amount of quicklime which is effectively necessary depends amongst other things on the physical qualities of the lime used. As an example, it has been remarked that a quicklime powder, all the electrostatic charges of which were removed, loses a great deal of its efficiency for use in obtaining the insoluble saccharose-lime combination, said efficiency being named hereinafter "sugar-removing efficiency." On the contrary, a freshly recalcined quicklime or also lime obtained from calcination of sugar-factory froths gives notably better results.

It has been proposed (see the manual of R.A. Mc GINNIS "Beet-sugar Technology" N.Y. 1951, pp 444–445) to replace a portion of quicklime by a lime milk mixed with the diluted molasses before addition of quicklime. This process did not practically allow one to substantially decrease the quicklime amount which is necessary if a correct sugar removal of the molasses is to be obtained and furthermore this known process does not give satisfactory results if the saccharose concentration of the diluted molasses subjected to the sugar-removing treatment is increased.

This invention has for its object to decrease the quicklime amount used during the cold sugar-removing process, which allows use of quicklimes having less good sugar-removing qualities without increasing working expenses; this invention has also for its object to treat less diluted molasses and consequently to increase the non-sugar concentration of the filtrate resulting from the precipitation treatment and from the filtration in order to use the filtrate under more economical conditions than heretofore as cattle food.

The process according to the invention is characterised in that it comprises a decantation step of the treated molasses, before filtration thereof, as well as the direct recirculation of the decantation product into the diluted molasses before addition of quicklime to the latter, the saccharose concentration of diluted molasses being higher than 6 percent.

The process according to the invention allows to treat diluted molasses containing up to 12 percent and more of saccharose, the quicklime requirements not exceeding 90 to 120 g of CaO per 100 g of saccharose present in the diluted molasses, and to obtain a purity of the saccharose-lime combination of 93 to 95 percent and a filtrate concentration of about 8 Brix.

It is recalled for any purposes that the purity of the saccharose-lime combination is estimated as follows: the saccharose-lime combination obtained from filtration is suspended in distilled water in the ratio of 100 g of saccharose-water combination to 100 g of distilled water. The whole is brought to 85°C and treated with carbon dioxide up to neutrality to phenolphthalein. One filters to remove the $CaCO_3$ formed and the saccharose content is determined on the filtrate by polarizing and the dry substance content by refractometry.
Apparent purity = saccharose × 100/dry substances Concerning the filtrate concentration, it is recalled that the Brix unity corresponds to 1 g of dry substances per 100 g of liquid.

It is moreover useful for the understanding of the benefits of the process according to the invention to know that the quality of a quicklime for sucrate-factory is a function of a complex number of criteria, the essential ones of which are: granulometry, apparent density, reactivity and contents of total CaO and active CaO.

A quicklime for sucrate-factory having a good sugar-removing efficiency has the following approximate features:

1. maximum fraction between 20 and 74$\mu$ (evaluated by sieving on a series of successive sieves)
2. apparent density: lower than 0.8 g/cubic cm
3. reactivity: between 8 and 15
4. content of total CaO: about 95 percent content of active CaO: about 92 percent The determination of criteria 2,3 and 4 will be explained hereinafter.

APPARENT DENSITY

An apparatus is used which comprises:
a cylinder having an internal diameter of about 30 mm and a height of about 40 mm.

The internal volume of this cylinder is precisely determined by filling it to the brim and by weighing water used to this end.
a wide enough orifice funnel is fixed above the cylinder, the mouth diameter of which is of 10 to 15 mm.
a housekeeping sieve having meshes of about 1 mm.

The cylinder is filled with lime powder after having sieved the latter through the sieve and dropped it through the funnel. Filling is continued until the powder overflows from the cylinder and forms a small crest. The latter is then cut to the brim of the cylinder by means of a thin metal blade.

During the whole filling operation, the cylinder is remained motionless and no mechanical packing (by shocks or pression) is made.

The cylinder filled with lime is weighed. From the net weight of the lime powder and the cylinder volume, the apparent density is calculated.

Example:
cylinder volume: 30.6 cm$^3$
net weight of lime: 21.4 g
apparent density: $21.4/30.6 = 0.70$ g/cm$^3$ Being given that the reproducibility of said determination is not perfect, one proposes to admit a 5 percent tolerance on the result.

REACTIVITY

A. APPARATUS

1. Mechanical stirrer provided with a stirring rod of insulating material.

Remark: The stirring speed will be regulated depending on the stirrer form so as to obtain an efficient mixing. However, a stirring speed of 200 r.p.m. obtained with a crescent-shape stirrer is sufficient to obtain such a result.

2. A thermostatic receptacle DEWAR of about one-half liter in capacity and with cover, allowing the passage of the stirring rod and of the thermometer.

3. Thermometer graduated from 0° to 100°C. The graduations from 20°C must be readable, i.e., projecting above the upper level of the cover. Care is to be taken that mercury receptacle be immersed sufficiently in order to obtain a correct reading of the lime milk temperature.

4. Chronometer

B. MODE OF OPERATION

Prepare the DEWAR receptacle by introducing the stirrer and the thermometer therein. Take care that the stirrer freely rotates.

Fill the DEWAR receptacle with 380 cm$^3$ of water at $20 \pm 0.5$°C.

Start the stirrer. Add 76 g of the lime powder to be examined as only one portion. Start a chronometer at the time of the addition.

Close the Dewar receptacle by means of a cover.

Check the temperature increase and note the time when the temperature has reached 40°C. This time is called T.

Calculater the "lime reactivity," expressed by:
Reactivity = 20/T in min.

Content in Total CaO and Active CaO 2.8 g of lime powder are weighed and introduced into a receptacle of about 250 cm$^3$ with addition of 100 cm$^3$ of distilled water previously boiled for expelling CO$_2$ therefrom and then cooled at room temperature.

After reaction for 2 minutes, a few drops of phenolphthalein solution are added. Then one begins to titrate the lime by means of a 5N nitric acid solution. The flow from the burette is of 2.4 cm$^3$/min.

The titration is interrupted as soon as the coloration of phenophthalein disappears. The number of cm$^3$ of acid used is noted at this time. This number of cm$^3$ is designated by X.

If the coloration of phenolphthalein comes back, the titration is then continued (without adjustment of the burette to zero point) till permanent coloration. The reading of the burette at this time is designated by Y.

Active lime in percent = $5xX$
Total lime in percent = $5xY$

It will be apparent from the remainder of the specification that the process according to the invention allows one to obtain sugar-removing results from molasses similar to those obtained with use of quicklime conventionally considered as being of good quality for sucrate-factory, when instead of quicklime of good sugar-removing efficiency, one uses quicklime of less good sugar-removing efficiency.

According to an advantageous embodiment of the invention, which allows to increase the saccharose concentration of the molasses diluted to 17–20 percent without increasing the quicklime consumption, filtrate is recirculated between the diluted molasses, after they have been mixed with the decantation product, and the filtration. By means of this improved process, the filtrate concentration is brought to about 12 BRIX.

Other details and particularities of the invention will become apparent from the description given hereinafter by way of a non-limitative example and with reference to the annexed drawings; the latter schematically show two cold treatment plants for sugar-factory molasses, one continuous plant, one batchwise plant, said plants being arranged for carrying out the process according to the invention.

The process according to the invention is based on the discovery that in any treatment of sugar-factory molasses by cold precipitation of the insoluble saccharose-lime combination, even if a quicklime of excellent sugar-removing efficiency is used, there is always a portion of this quicklime which is not reacted, either due to the fact that the particles have been coated with the insoluble saccharose-lime combination, or due to a bad design or an irregular operation of the plant for cold sugar removal of molasses, or still for other unknown reasons. If sugar-factory lime is used, still more unreacted lime will be found. This unreacted lime has lost most of its sugar-removing efficiency, but may be used according to the process of the invention, if said lime is directly added to the diluted molasses.

In order to recover unreacted lime when the insoluble saccharose-lime combination is cold precipitated, the invention proposes to apply a short-duration decantation to the treated molasses. In a preferred practical embodiment of the process according to the invention, molasses after having been subjected to the cold precipitation with quicklime of good or less good sugar-removing efficiency undergo a short-duration decantation, continuous or batchwise, according to the manner in which the cold precipitation is conducted and the thickened slurries obtained by decantation are sent into the molasses diluted with the minimum sugar-removed liquid necessary for transfer.

In order to prevent an accumulation of insoluble impurities in the plant, such as for example sand, CaCO$_3$ and the like, a portion of the thickened slurries is sent to the diluted molasses, the remaining portion being sent to filtration.

The amount of recirculated decantation product depends on the lime value of the decantation product. The recirculated product amount is preferably selected in order that the amount of lime present in the diluted molasses represents up to 2 mols per mol of saccharose dissolved in the diluted molasses.

The plant for continuous treatment of sugar-factory molasses, shown in FIG. 1, comrises a diluted molasses tank 1 provided with a diluted molasses inlet 2, a reaction vat 3 for cold precipitation, which is connected at 13 to tank 1 and provided with a quicklime inlet 4, as well as a decanter 5 connected on the one hand to vat 3 and on the other hand to filters 7 through a duct 6. It is to be understood that suitable cooling means are in association with the plant, for example with the reaction vat 3.

The decanter 5 comprises a collecting hopper 8 for slurries, provided with an outlet 9 connected to the tank 1 of diluted molasses. On this outlet 9 is branched a treated molasses drawing-off duct 10 connected to the duct 6 going to the filters 7.

A broken line 11 represents a recirculation duct for treated molasses, said duct returning to reaction vat 3. Said recirculation is described in a series of patents in the name of Raffinerie tirlemontoise, the original ones of which are Belgian Pat. Nos. 735,802 and 752,442; it concerns the recirculation of several, generally 3 to 7, volumes of treated molasses per volume of molasses diluted entering the reaction vat and has the advantage to improve the filterability of treated molasses and to allow the treatment of molasses of higher content of saccharose than in the conventional process which treats molasses with 6 percent of saccharose.

The treatment according to the present invention is more particularly advantageous when it is combined with the described recirculation treatment obtained by means of duct 11.

The basic process according to this invention is moreover advantageously improved by means of a cold filtrate recirculation into the cycle of diluted molasses, after they have been mixed with the decantation product. The cold filtrate can be introduced either in the reaction vat 3, or in the decanter-separator 5, or partially in the reaction vat 3 and partially in the decanter-preparator 5. This way to proceed allows to treat dilutions of molasses richer in saccharose and to better separate the unreacted lime from the insoluble combination.

The recirculated amount of cold filtrate is of about one to seven volumes per 10 volumes of treated diluted molasses. This filtrate recirculation allows to treat diluted molasses the saccharose concentration of which can reach 20 percent, without need to increase the relative consumption of quicklime.

When the saccharose concentration of diluted molasses is below 15 percent, the recirculated cold filtrate amount is preferably sent into the decanter-separator 5 and it is preferably entered the bottom of the decanter-separator 5.

On the contrary, when the saccharose concentration of diluted molasses is between 15 and 20 percent, a portion of the recirculated amount of cold filtrate will be sent into the reaction vat 3, the remaining portion being preferably sent to the bottom of the decanter-separator 5. The portion of the cold filtrate amount which is recirculated into the reaction vat 3 varies with the saccharose concentration of the diluted molasses which are used, namely more the concentration is high, larger will be the portion of cold filtrate which is recirculated into the reaction vat 3, the remaining portion of the cold filtrate amount being then sent to the bottom of the decanter-separator 5. As an example, when a dilution of molasses with 17 percent of saccharose is treated, two volumes of cold filtrate is recirculated into the reaction vat 3 per 10 volumes of diluted molasses to be treated, and two volumes of cold filtrate per 10 volumes of molasses to be treated are recirculated into the decanter-separator 5, preferably through the bottom thereof.

On the contrary, when a dilution of molasses with 20 percent of saccharose is treated, said amounts are of 3.5 and 3.5 respectively.

In FIG. 1, a broken line represents a duct 12 for recirculation of cold filtrate, said duct introducing the recirculated filtrate through the bottom of the decanter-separator 5. A line 12A is branched on duct 12 and leads to the reaction vat 3. This line 12A can be put in operation or not; finally it is possible to provide to put the portion 12B of the duct 12 out of operation, by so discontinuing any entry of cold filtrate in the decanter 5.

Laboratory tests were made by treating molasses diluted at 15 percent of saccharose and by using at the total 120 g of CaO per 100 g of saccharose present in the diluted molasses; the holding times were of about 15 minutes in the vat 3 and of 7 to 10 minutes in the decanter; to compare the yield of the process according to the invention in terms of the sugar-removing efficiency of the quicklime used, two series of tests were made for each of which the lime used had the following characteristics:

|  | I | II |
|---|---|---|
| Active CaO | 92 | 76.2 |
| Total CaO | 95.5 | 94.3 |
| Density | 0.7 | 1.0 |
| Granulometry | 10% refuse | 25% refuse |
| Reactivity | 16 | 4.0 |

The reaction vat 3 acted with a recirculation of treated molasses at 11, at the ratio of five volumes of treated molasses per volume of diluted molasses entering the reaction vat.

The following results give an indication of the advantages obtained by means of the working of the invention.

|  | Without return of filtrate into the decanter 5 | | With return of filtrate into the decanter 5 | |
|---|---|---|---|---|
|  | I | II | I | II |
| 1. Characteristics of the decantation product (duct 9) |  |  |  |  |
| Unfiltered alkalinity (g of CaO % ml) | 20 | 26 | 25 | 35 |
| Filtered alkalinity (g of CaO % ml) | 1.1 | 1.1 | 1.1 | 1.1 |
| CaO % sugar | 140 | 185 | 165 | 270 |
| 2. Characteristics of the diluted molasses mixed with the decantation product (duct 13) | I | II | I | II |
| Unfiltered alkalinity (g of CaO % ml) | 6 | 14.5 | 7.5 | 18 |
| Filtered alkalinity (g of CaO % ml) | 4.8 | 4.85 | 4.8 | 4.9 |
| CaO % sugar | 32 | 32.3 | 32 | 32.6 |
| 3. Polarizing of the filtrate | I | II | I | II |
|  | 0.7 | 0.9 | 0.5 | 0.6 |

The following Table allows to present a comparison between the known processes (1 and 2) for cold treatment of sugar-factory molasses and the two embodiments of the process according to the invention, concerning the essential parameters. The known process 1 results from use of a plant of the kind shown and described in "Beet Sugar Technology" of Mc Ginnis, N.Y. 1951, page 448, FIG. 16-3. The process 2 is described in the Belgian Pat. No. 752,442.

mixed with the non-discharged slurries, before addition of quicklime at 18.

A duct 23 for partial recirculation of cold filtrate can be provided between filters 22 and hopper 20; cold filtrate enters during the decantation step.

It is to be understood that the invention is not limited to the embodiments described and that many variants can be brought therein without departing from the scope of the present patent.

| Process | Maximum sugar concentration of diluted molasses g of sugar % cm³ | Requirements in lime CaO /sugar × 100 | Purity trisaccharate | BRIX of filtrate |
|---|---|---|---|---|
| 1. Classical Steffen's process | 6 | ± 120 | 88 to 90 (*) | 4 |
| 2. Continuous sucrate formation R.T. without separation (Belgian patents n° 735,802 and 752,442) | 15 | ±140 | 93 to 95(*) | 10 |
| 3. Continuous sucrate formation R.T. with decantation (present patent application without line 12) | 12 | ± 100 to 120 | 93 to 95(*) | 8 |
| 4. The same as 3 but with partial return of filtrate (presence of a line of the kind 12) | 17 to 20 | ± 100 to 120 | 92 to 94(**) | ± 12 |

R.T. = Raffinerie tirlemonotoise
The data given for lime requirements and saccharate purity can vary in terms of the quality of lime and of worked molasses.
(*) data obtained in industrial tests
(**) data obtained in laboratory tests It is to be understood that the decantation as well as the partial return of filtrate which were described hereinabove can be applied, without departing from the scope of the present patent, to plants for cold treatment of sugar-factory molasses other than those of the kind shown in FIG. 1. As an example, they can be applied to the plant for working the SPRECKELS process described in the above-cited publication, page 449. This plant which however cannot treat molasses diluted at more than 6 to 8 percent would be according to the invention completed by a decanter-separator of treated molasses, with or without return of cold filtrate, the decantation-separation product being directly sent back to the diluted molasses, by replacing the feeding of lime milk.

The treatment plant, shown in FIG. 2, is of the classical discontinuous Steffen kind; it comprises a reaction vat 14 provided with a mixer 15 and a cooling element 16, a feeding 17 of diluted molasses and a feeding 18 of quicklime arriving to said vat while an outlet 19 of treated molasses starts therefrom. The vat 14 comprises a hopper 20 allowing to recolt therein the slurries issuing from a decantation step carried out after the step of introduction of quick lime and of precipitation of the insoluble saccharose-lime combination; hopper 20 is provided with a line 21 for a periodical drawing-off of the slurries, said line being connected to line 19 going to the filters 22.

The operation of this plant is characterised in that before discharging treated molasses at 19, a short duration decantation is made, a portion of the so recolted slurries is discharged at 20 and it is only at this time that a new portion of diluted molasses to be treated is introducted at 17; this new portion of diluted molasses is Thus the ordinary decantation could be replaced by an accelerated decantation, particularly by centrifuging. This way to proceed is advantageous because it allows one to reach a particularly low overall consumption of quicklime.

We claim:

1. In the process for cold treatment of sugar-factory molasses wherein precipitation of a saccharose-lime combination is accomplished by the addition of quicklime to molasses diluted to more than 6 percent of saccharose and the precipitated molasses is filtered, the improvement which comprises decanting the precipitated molasses prior to filtration and directly recirculating a portion of the decantation product to additional diluted molasses before adding the quicklime thereto.

2. The process of claim 1 wherein the amount of the decantation product recirculated to the diluted molasses corresponds to about 2 mols of lime dissolved in diluted molasses per 1 mol of saccharose initially present.

3. The process of claim 1 wherein about 90–120 grams of quicklime are added per 100 grams of saccharose present in the diluted molasses.

4. The process of claim 1 wherein cold filtrate is recirculated either to the precipitation vessel or to the decantation vessel.

5. The process of claim 4 wherein the amount of recirculated filtrate is 10–70 percent of the volume of diluted molasses.

6. The process of claim 4 wherein the saccharose concentration of the diluted molasses is higher than 12 percent.

7. The process of claim 4 wherein the concentration of the diluted molasses is higher than 15 percent.

8. The process of claim 4 wherein up to seven volumes of cold filtrate is recycled per 10 volumes of diluted molasses.

9. The process of claim 4 wherein several volumes of molasses treated in the precipitation step are recycled and mixed with diluted molasses prior to the addition of quicklime thereto.

10. The process of claim 7 wherein the sugar-factory molasses is diluted to more than 12 percent saccharose.

11. The process of claim 7 wherein the sugar-factory molasses is diluted to more than 15 percent of saccharose.

* * * * *